Patented June 28, 1932

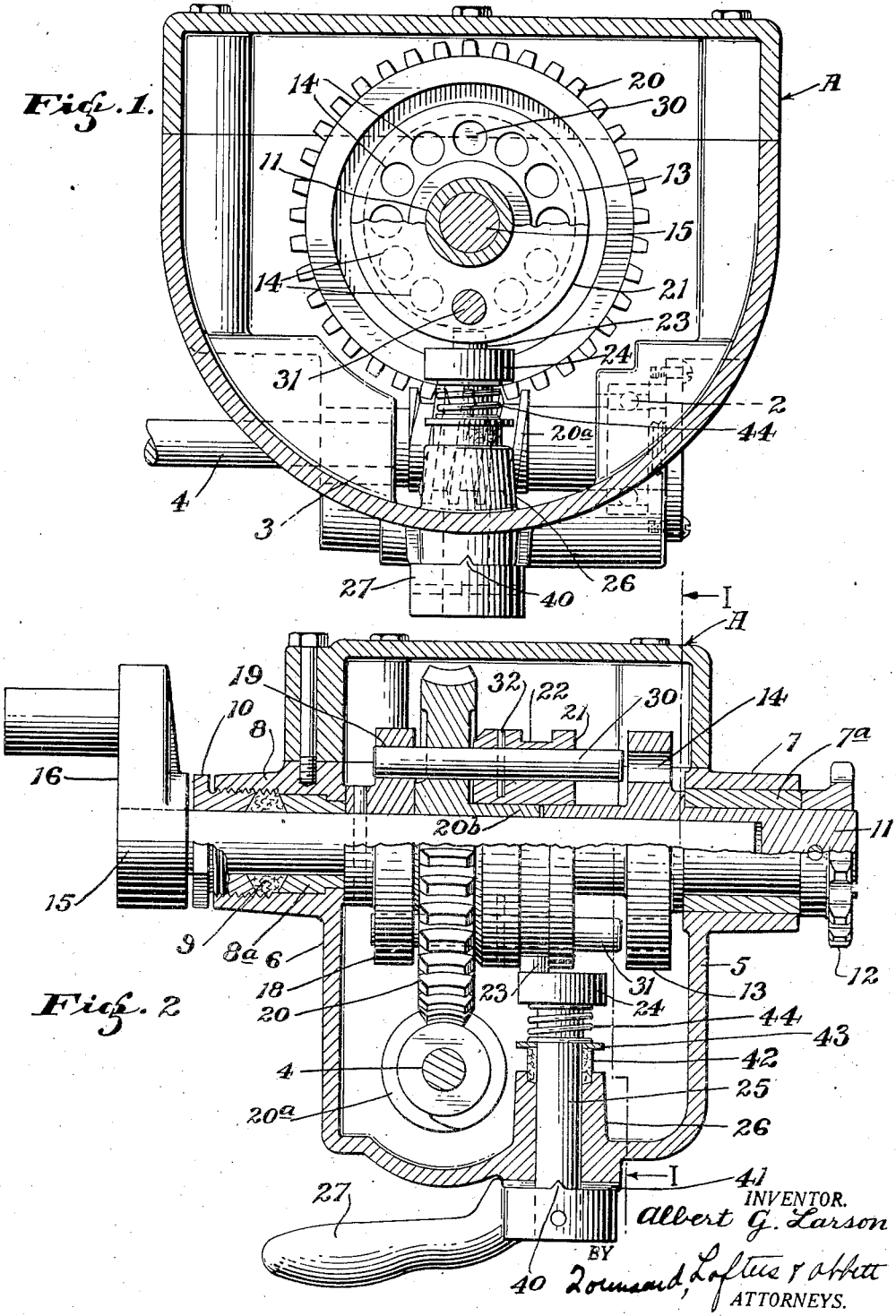

1,865,022

UNITED STATES PATENT OFFICE

ALBERT G. LARSON, OF PIEDMONT, CALIFORNIA

DRIVING MECHANISM

Application filed June 6, 1929. Serial No. 368,754.

This invention relates to a driving mechanism, and especially to a mechanism employing a continuously driven drive shaft from which power is transmitted to one or another of a pair of driven shafts, or to both in unison.

The object of the present invention is to generally improve and simplify the construction and operation of driving mechanism of the character described; to provide a driving mechanism which is especially adapted for use in conjunction with washing machines having a wringer attachment; to provide a driving mechanism embodying a washing machine driving shaft, a wringer driving shaft and a main continuously driven drive shaft, and further to provide means whereby power may be transmitted from the drive shaft either to the wringer or to the washing machine driving shafts, or to both shafts in unison.

The invention is shown by way of illustration in the accompanying drawing, in which:

Fig. 1 is a central vertical section of the driving mechanism taken on line I—I of Fig. 2, Fig. 2 is a central vertical longitudinal section taken through the driving mechanism.

Referring to the drawing in detail, A indicates a housing in the bottom portion of which is formed two bearing members such as indicated at 2 and 3. Extending through the bearing 3, and also into the bearing 2 is a main drive shaft, generally indicated at 4, this shaft being adapted to be driven from any suitable source of power, not here shown.

Formed on the opposite sides of the housing, indicated at 5 and 6, are bearing members 7 and 8. Both bearings are provided with bushings, as indicated at 7a and 8a, and the bearing 8 is also provided with a packing 9 and a stuffing gland 10.

Journalled in the bushing 7a is a driven shaft, generally indicated at 11. Secured on the outer end thereof is a sprocket gear 12, and formed near the inner end is a clutch member, which consists of an annular collar, or disc such as shown at 13, in which is formed a series of drilled holes or perforations 14. The shaft 11 is drilled or bored out to receive the inner end of a second driven shaft, generally indicated at 15. This shaft extends through the bearing or bushing 8 and it may be provided with a crank or the like on its outer end, such as shown at 16. Shaft 15 is journalled first in the bearing bushing 8 and secondly in the inner end of the shaft 11. It maintains the shafts in alignment and it furthermore permits either shaft to be driven independently of each other, or in unison, as will hereinafter be described.

Shaft 15 also serves as a support for a clutch member 18, which consists of an annular collar having drilled holes or perforations 19 formed therein, which furthermore supports a worm gear 20 and a clutch shifting collar 21. This collar is provided with an annular groove 22, into which projects a pin 23 carried by a head member 24 formed integral with, or secured on the upper end of a shaft 25. This shaft is journalled in a bearing 26 formed in the bottom of the housing, and the outer end of the shaft carries a shifting lever 27. The shifting collar 21 functions as a main clutch member, as two rods are secured therein, as indicated at 30 and 31, these rods being secured by pins 32 or the like.

The worm gear 20, as previously stated, is free to rotate on the shaft 15, and it meshes with a worm pinion 20a secured on the main drive shaft 4. Hence, the gears 20 and 20a will be continuously rotated when power is transmitted to the drive shaft. The main clutch member or collar 21 is free to rotate on a hub member 20b formed on the gear 20, and it is also free to rotate on the inner end of the shaft 11. It may furthermore be stated that the main clutch member is movable longitudinally of the shaft 11, and the hub 20b, longitudinal movement being imparted by rotating the shifting lever 27. This rotates the shaft 25 and as pin 23 is eccentrically positioned with relation to the shaft, clutch member 21 will be moved longitudinally. When it assumes the position shown in Fig. 2 power will be transmitted to the clutch member 18 and shaft 15, while shaft 11 will remain stationary.

If the clutch member 21 is shifted to a central position between the gear 20 and the clutch member 13, the pins 30 and 31 will enter the openings 14 of the clutch member 13, and both the shafts 15 and 11 will then be driven. On the other hand, if the clutch member 21 is moved into engagement with the clutch member 13, then the pins 30 and 31 will move out of the openings 19 formed in the clutch member 18, and power will then be transmitted to the shaft 11, it being understood that the clutch member 21 is at all times driven by the gear 20, as the pins 30 and 31 extend through the web of the gear 20, and as such will be driven thereby.

From the foregoing it will be noted that I have provided a continuously driven drive shaft, a pair of driven shafts such as shown at 11 and 15, and means for transmitting power to either of the driven shafts independently of each other, or to both in unison. The driving mechanism has been particularly designed for use in conjunction with washing machines as, for instance, the shaft 15 with its crank 16 may be employed to drive the impeller or agitating part of the washing machine, while the sprocket gear 12 or shaft 11 may be employed to drive the wringer. Where the driving mechanism is connected in the manner specified the washing machine alone may be driven, or the wringer alone, and when desired both the wringer and the washing machine can be driven in unison.

By referring to Fig. 2 it will be noted that the shifting lever 27 is provided with V-shaped prongs 40 which are adapted to enter grooves 41 in the end of the bearing 26. It will further be noted that a felt packing 42 surrounds the upper end of the shaft 25, and that this is engaged by a washer 43 and a spring 44, the spring serving the function of retaining the prongs 40 in engagement with the notches, and also that of maintaining the felt packing under compression and pin 23 in engagement with the annular groove 22 of the shifting collar. The transmission case may be filled with grease, or a similar lubricant, thus requiring comparatively little attention the year around. It is simple and compact in construction, and as such requires comparatively little space, and it may furthermore be adapted to washing machines of different types wherever a wringer attachment is employed.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. A clutch mechanism of the character described comprising a housing, a driving member therein, a pair of driven shafts journaled in the housing and aligning with each other, a pair of perforated clutch collars secured one on each driven shaft, a gear co-axially disposed and freely rotatable with relation to the driven shafts, a driving clutch member supported by the driven shafts and free to rotate with relation thereto, a pair of rods secured in the driving clutch member and extending through the gear, and means for imparting longitudinal movement to the driving clutch member so as to move the rods carried thereby into or out of engagement with either of the perforated clutch collars or into engagement with both.

2. A clutch mechanism of the character described comprising a housing, a driving member therein, a pair of driven shafts journaled in the housing and aligning with each other, a pair of perforated clutch collars secured one on each driven shaft, a gear co-axially disposed and freely rotatable with relation to the driven shafts, a driving clutch member supported by the driven shafts and free to rotate with relation thereto, a pair of rods secured in the driving clutch member and extending through the gear, means for imparting longitudinal movement to the driving clutch member so as to move the rods carried thereby into or out of engagement with either of the perforated clutch collars or into engagement with both, said means comprising a shifting lever, a shaft journaled in the housing and secured thereto, and a shifting member secured on said shaft and engaging the driving clutch member.

3. A device of the character described comprising a casing, a pair of co-axially disposed independently rotatable driven shafts journalled in opposite sides of the casing, one of said shafts having a recessed portion in one end and the other shaft being journalled in said recess, collars secured to said shafts and having holes formed therein, a driving gear also having holes formed therein, a clutch member freely rotatable with relation to said driven shafts, pins carried by said clutch member and extending through the holes in said driving gear, said pins being adapted through movement of the clutch member to be inserted into the holes formed in either of said collars for driving the same and also being adapted to be inserted into the holes of both of said collars and driving both driven shafts simultaneously.

ALBERT G. LARSON.